United States Patent
Belcher et al.

3,987,397
Oct. 19, 1976

[54] REMOTE UNIT FOR A TWO-WAY CABLE COMMUNICATIONS SYSTEM

[76] Inventors: Brian E. Belcher, 7023 Wakefield, Dallas, Tex. 75231; John G. Campbell, 1109 Portales Lane, Irving, Tex. 75060

[22] Filed: Apr. 25, 1975

[21] Appl. No.: 571,576

[52] U.S. Cl. ................................ 325/308; 325/31; 178/DIG. 13
[51] Int. Cl.$^2$ ......................................... H04B 1/00
[58] Field of Search ............... 325/31, 308, 309, 37, 325/390–394, 458, 459, 464, 465; 178/DIG. 13

[56] References Cited
UNITED STATES PATENTS

| | | | |
|---|---|---|---|
| 3,757,225 | 9/1973 | Ulicki | 325/308 |
| 3,768,019 | 10/1973 | Podowski | 325/391 |
| 3,794,922 | 2/1974 | Osborn et al. | 178/DIG. 13 |
| 3,803,491 | 4/1974 | Osborn | 178/DIG. 13 |
| 3,886,302 | 5/1975 | Kosco | 325/308 |

OTHER PUBLICATIONS

I.E.E.E. Spectrum Applications Report on "Two–Way Applications for Cable Television Systems in the '70s", by Jurgen, pp. 39–54, 11/1971.

*Primary Examiner*—Robert L. Griffin
*Assistant Examiner*—Jin F. Ng
*Attorney, Agent, or Firm*—Giles C. Clegg, Jr.

[57] ABSTRACT

A two-way cable communications system includes a master station having a transmitter for transmitting television program and interrogation signals to a plurality of remote units or transceivers through a cable network and a receiver for receiving reply signals from individual ones of the remote units. Each remote unit includes a receiver for receiving the program and interrogation information from the master station, a transmitter for transmitting reply signals back to the master station and television converter and receiver means for reproducing the television programs. A remote control means coupled to the remote unit through a mmulticonductor cable includes a channel selector and encoder means for encoding the channel selector information and a switch means to enable the channel selector to be utilized to provide viewer response information. The output of the encoder means is clocked into a storage register having its output coupled to a converter which operates a television tuner when the switch means is in a first condition. The output of the storage register is also coupled to a data readout circuit which is enabled by an interrogation signal to apply the data to the remote transmitter. The encoder output is also applied to a gating circuit which is enabled when the switch means is in a second condition to couple the output to the data readout circuit. Thus both program rating and viewer response information may be obtained from the remote channel selector control.

12 Claims, 5 Drawing Figures

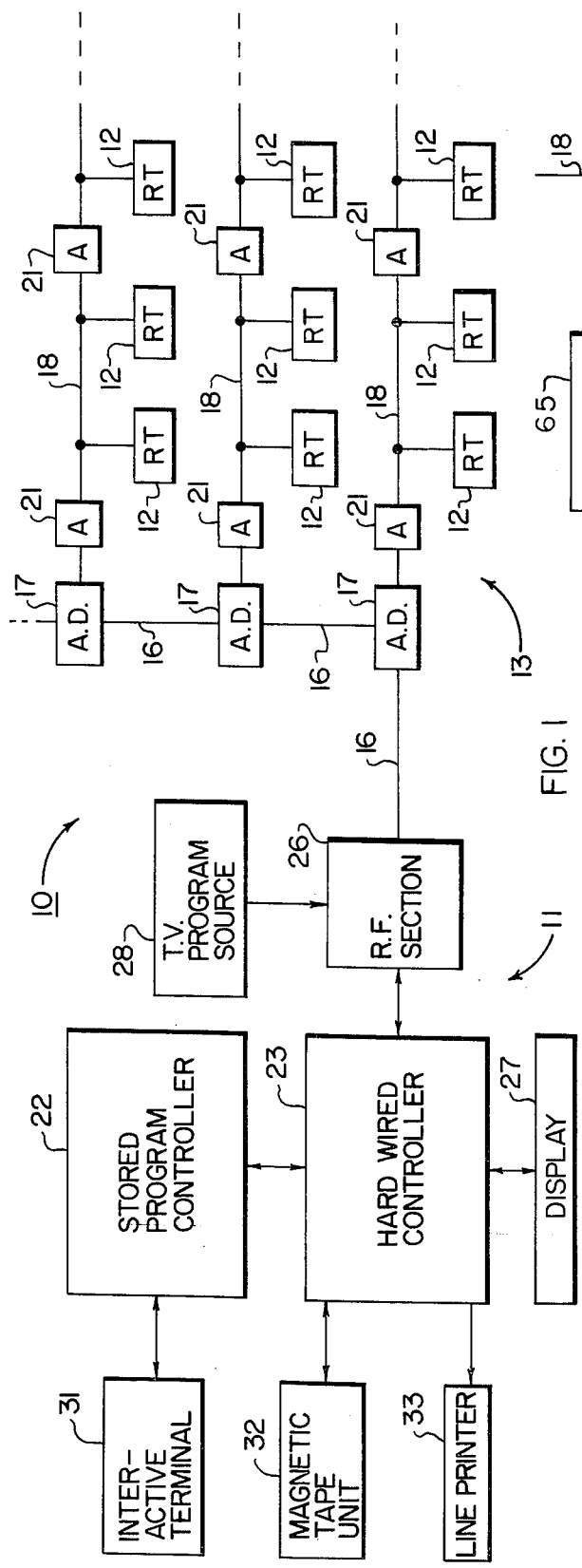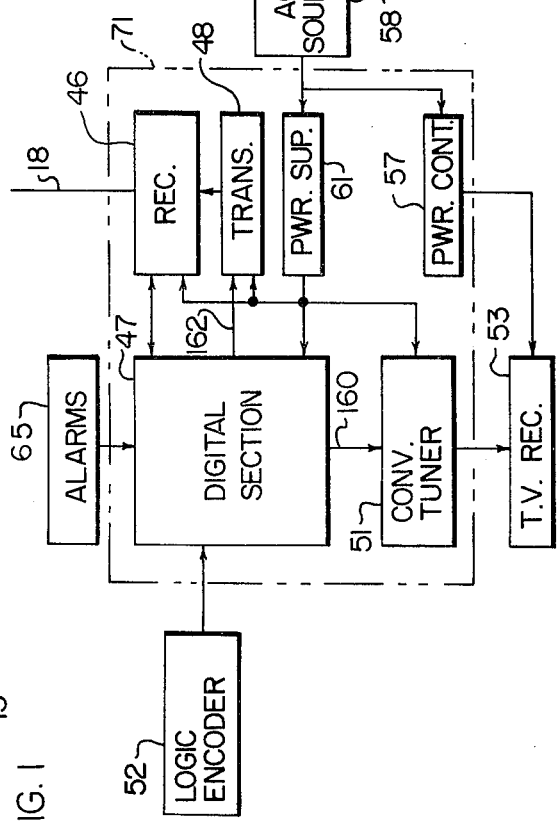
FIG. 1
FIG. 2a
FIG. 2b
FIG. 3

REMOTE UNIT FOR A TWO-WAY CABLE COMMUNICATIONS SYSTEM

BACKGROUND OF THE INVENTION

1. Field of the Invention

The present invention relates to remote transceivers for two-way cable communications systems and, more particularly, to local remote control means for such remote transceivers.

2. Technical Considerations and Prior Art

In two-way cable communications systems, for example, the systems disclosed in U.S. Pat. Nos. 3,794,922 and 3,803,491, a plurality of remote transceiver units are interrogated and controlled by signals generated downstream from a central or master station. The transmitted interrogation and control signals are generated in the radio-frequency range and are encoded into serially divided successive frame periods including, among other things, a remote transceiver identification code interval, a remote transceiver control code, a remote transceiver function selector code interval and a data readout control interval.

Each remote transceiver includes a number of data encoders and control mechanisms and a transmitter section for transmitting reply data upstream to the master station. The downstream interrogation and control signals are decoded at the remote transceivers and the particular remote transceiver identified is enabled to transmit data signals during the data readout interval. The particular data transmitted upstream is requested by a word count signal transmitted downstream by the master station during the function selector code interval. The upstream data may include, among other things, fire and burglar alarm information and meter readings from water, gas and electric meters or the like.

When utilized in conjunction with a community antenna or cable television system each remote transceiver is associated with a commercial television receiver and includes a converter circuit for converting downstream programs into commercial television frequencies to enable any one of various transmitted programs to be viewed. In this connecting the upstream transmitted data may include program rating data including pay television authorization data and viewer response or opinion data.

When utilized in connection with cable television systems, the remote transceivers may be incorporated into the commercial television receivers associated therewith, but are more often self-contained units or control boxes which are placed on or adjacent to the commercial television receiver. The converter in the control box is tuned by a channel selector, usually a dial, connected to a plurality of camming elements through a common control shaft. Each camming element controls a switch to provide a binary bit to encode the position of the channel selector. The coded channel selector information provides a voltage to a varactor in the converter through a digital-to-analog converter to tune the remote transceiver converter to a desired one of a plurality of channels.

One popular form of remote transceiver includes a remote tuner control which is connected to the control box through a multiconductor cable. With this latter arrangement a problem arises when it is desired to provide program rating information to the central station in order that information as to the channel being viewed be available for transmission to the master station on command. Because of the inconsistencies between varactors, a mere determination of the varactor voltage and subsequent conversion thereof to a digital readout capable of upstream transmission in response to a command from the master station for program rating information is inaccurate.

One technique for providing both remote control tuning and program rating information may include providing a second set of program rating switches in the remote channel selector and a separate group of conductors or a separate cable from the remote channel selector to the remote transceiver. The second set of program rating switches would thus be available to enter the encoded selected channel information into the data readout circuit for transmission upstream to the master station. This solution, however, requires both the size of the remote channel selector and the size of the connecting cable to be increased. Since the remote channel selector units are preferably small enough to be hand-held, this solution renders them unduly cumbersome as well as costly and is thus undesirable.

As taught in the aforementioned patents it is desirable to include viewer response circuitry in the remote transceiver in order to permit the viewer to transmit back to the master station opinions or responses asked of the viewing audience during a particular program. These opinions are usually stated in binary form as "yes" or "no" or "no opinion." It is desirable to provide a range of opinions or other viewer-initiated data in such viewer response circuitry. It would be particularly desirable to provide for a wide range of viewer responses which could be carried out by the viewer from a hand-held remote control such as the remote channel selector without increasing its size or the number of cable conductors connecting it to the remote transceiver control box.

SUMMARY OF THE INVENTION

One object of the present invention is to provide a new and improved remote transceiver for a two-way cable communications system.

A further object of the present invention is to provide a new and improved remote transceiver for a two-way community antenna or cable television system.

A further object of the present invention is to provide a new and improved remote transceiver for a two-way cable television system wherein a remote control apparatus may be utilized at the remote transceiver to control the selection and response functions of the remote transceiver.

A further object of the present invention is to provide a new and improved remote transceiver for a two-way cable television system wherein a remote control apparatus may be utilized to control the selection and response functions of the remote transceiver while permitting a data readout and upstream transmission of the channel being viewed at the remote transceiver.

A further object of the present invention is to provide a new and improved remote transceiver for a two-way cable television system utilizing a remote control apparatus to control the selection and response functions of the remote transceiver wherein a large range of possible responses are available for transmission back to the master station.

A further object of the present invention is to provide an encoder apparatus for a remote transceiver in a two-way cable television system which serves the function of a local remote control for the transceiver and features a channel selector mechanism having an encoded output which can be read by a data readout both for the purpose of program rating data and viewer response data.

A further object of the present invention is to provide a new and improved remote transceiver for a two-way cable television system utilizing a remote control apparatus to control the selection and response functions of the remote transceiver wherein channel selection data may be stored during responses to permit the same mechanism to serve the dual function of channel selection and viewer response.

A remote control unit for a two-way cable communications system including a master station for transmitting television program and interrogation signals and for receiving reply signals, in accordance with the principals of the present invention, may include receiver means for receiving television program and interrogation signals transmitted by the master station, transmitter means for transmitting reply signals back to the master station, television receiver means for reproducing the television programs, channel selector means for selecting the television channel to be viewed and for providing viewer response information, encoder means coupled to the channel selector means for encoding the selected channel, switch means having first, second and third operative conditions storage means coupled to the encoder means for storing the channel selector information when the switch means is in the first and second conditions, gate means coupled to the encoder means and enabled when the switch means is in the first and second conditions, tuning means coupled to the television receiver, converter means for applying the output for the storage means to the tuning means for controlling the tuning means for operating the gate means when the switch means is in the third condition, and decoder means coupled to the gate means and the storage means responsive to a selected interrogation signal for applying the output of the gate means and the storage means to the transmitter means.

BRIEF DESCRIPTION OF THE DRAWINGS

A complete understanding of the present invention will be obtained from the following detailed description of a preferred embodiment thereof, when taken in conjunction with the accompanying drawings, wherein:

FIG. 1 is a block schematic diagram of a two-way cable communications system in accordance with the principles of the present invention;

FIGS. 2a and 2b show in schematic fashion two of the basic transmission data formats employed in the communications system of FIG. 1.

FIG. 3 is a block schematic diagram of a remote unit or transceiver forming part of the system of FIG. 1.

DETAILED DESCRIPTION

Figure 4:
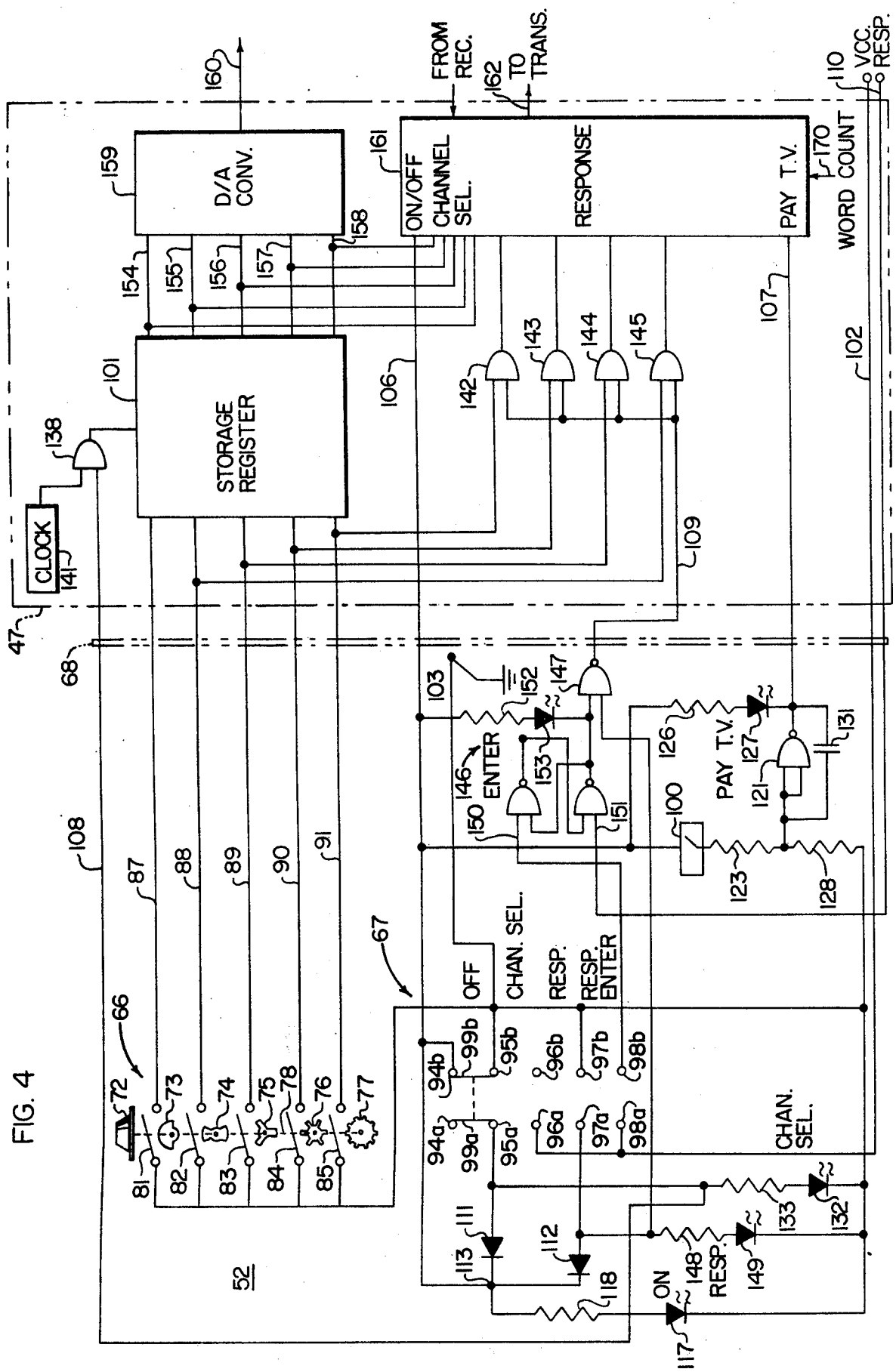
FIG. 4 is a more detailed schematic diagram of a portion of the remote unit of FIG. 2, particularly illustrating a remote control unit for the remote transceiver.

Referring to FIG. 1 there is shown a computer controlled, broadband, coaxial, two-way communications sytem 10 which includes a central data system (CDS) 11 connected to a plurality of remote units or transceivers 12—12 through a coaxial cable network or signal distribution system indicated generally at 13.

The cable distribution system 13 includes a coaxial trunk cable 16 having various bi-directional trunk amplifier and distribution units 17—17 connected at spaced points therealong. Coaxial type feeder cables 18—18 extend outwardly from respective ones of the amplifier and distribution units 17—17 to connect the remote transceivers 12—12 into the system 10. Various bi-directional amplifiers 21—21 are located at spaced points along the feeder cables 18—18 to amplify signals transmitted downstream from the CDS 11 to the remote transceivers 12—12 and to amplify upstream transmission from the remote transceivers 12—12 to the CDS 11.

The CDS 11 is the main control element of the system 10, which supervises, monitors and interprets all communications therein. Each remote transceiver 12 decodes the information intended for itself and executes commands transmitted to it from the CDS 11 through the cable network 13.

The CDS 11 includes a stored program controller 22, a hard-wired controller 23, an RF section 26, a display console 27, a television program source 28 and peripheral equipment 31, 32 and 33.

The stored program controller 22 supervises the system operation and analyzes the data received from the remote transceivers 12—12. The stored program controller 22 may be, for example, an Interdata Model 70 Computer, or any suitable 16-bit stored program general purpose computer. The computer memory is preferably 16 kilobytes having a memory full cycle time of approximately one micro-second.

The hard wired controller 23 is the logic control element of the system 10 and provides the basic systems communications timing function through a system clock therein.

The RF section 26 translates digital downstream interrogation and program information from the hard wired controller 23 and the program source 28 into a form suitable for modulation on the cable network 13. In addition, the RF section 26 accepts modulated upstream information from the cable network 13 and translates the information into digital form. Thus storing 16 bits of information for each unique group over both transceivers 12—12. The RF section 26 preferably includes a transmitterr assembly and a receiver/-register assembly. The transmitter in the RF section 26 accepts the digital interrogation information from the hard wired controller 23 and modulates the information in the 48 to 50 MHz range. The repetitive frequency of the digital data preferably does not exceed a rate level of 25 KHz and the input digital levels are preferably standard TTL logic levels. The output of the transmitter is impedance-matched to the cable network 13, the characteristic impedance of which is 75 ohms. The method of modulation utilized is preferably a phase-encoding technique, but may be of various types compatible with the receiver and detection circuitry in the remote transceivers 12—12, for example, the three frequency coding technique set forth in U.S. Pat. No. 3,794,922.

The receiver/register in the RF section 26 accepts the broad band input from the cable system 13 in the frequency range between 5 and 35 MHz and detects the coded information transmitted to the CDS 11 by the remote transceivers 12—12 on one specific frequency. Each bit of detected information may be subsequently shifted into a 16-bit data register for temporary storage by the hard wired controller 23. The register portion of the receiver/register in the RF section 26 may be provided with two outputs, one for on-line operation and the other for off-line operation.

The display console 27 provides a visual indication of specific alarm conditions on the system 10 and is the focal point of the system initialization and mode of operation selection. The display console 27 may include a data display section and a mode selection section. The data display section displays the 16 bits of information received from an individual remote transceiver and may do so in several ways, e.g., 16 individual bit lamps or indicators or by a decimal representation in a numeric display.

The mode selection section of the display console 27 permits selection of either on-line or off-line operation. On-line operation occurs when the system 10 is under the controlled supervision of the stored program controller 22. In this mode, the data display section of the display console 27 is updated solely by the stored program controller 22. No other switch settings on the display console affect the system operation while the system is in the on-line mode.

In the off-line mode, the system is under the supervision of the hard-wired controller 23. The off-line mode may include two sub-modes, for example, a manual sub-mode and a semi-automatic sub-mode. In the manual off-line sub-mode one identification code may be continually interrogated and the results of the interrogation may be displayed on the display console 27 through a display switch or the like. Command codes may be transferred to specific remote transceivers 12 through suitable switching means. A remote transceiver which either updates the display or receives the command code is selected individually.

When the semi-automatic off-line sub-mode has been selected, all the remote transceivers 12—12 are sequentially interrogated and the results of the interrogations are analyzed for possible alarm conditions. If an alarm condition occurs, the data display section of the display console 27 is updated with an appropriate description of the unit involved and the type of alarm occuring.

The television program source 28 provides signals for the desired number of television channels (e.g., 36 channels) through a high pass filter and the coaxial cable distribution network 13 to each of the various remote transceivers 12—12 connected thereto. These television signals may fall within, for example, a 50 to 300 MHz frequency range.

The peripheral equipment may include an interactive terminal 31, for example, a combination keyboard-entry and hard-copy print out device such as a Teletype Corporation Model ASR 33. The interactive terminal 31 may be provided with a paper tape reader and a paper tape punch. The reader and punch may be operated in parallel with or independent of the keyboard printer. The interactive terminal 31 permits an operator to communicate with stored program controller 22 and thus other portions of the system 10. The unit 31 is thus the primary source of initiating requests to determine the status of system operation as well as to provide a hard copy of the results of the system request.

A magnetic tape unit 32 may be utilized for program loading, information storage and off-line data processing. It is preferably in the form of a cassette cartridge unit, for example, a Dicom, Inc., Model 344.

A line printer 33 may be utilized to print computer-generated information which may not be feasibly prepared on the interactive terminal 31. This would include, for example, computer assemblies, diagnostic results and invoice preparation information under the control of the stored program controller 22.

In addition to the peripheral equipment set forth above, additional peripheral equipment may be provided, depending upon the use to which the system 10 is put. These devices may include automatic sending and receiving units, keyboard sending and receiving units and receiving only units as well as additional CRT terminals, typewriters, and the like.

FIG. 2 shows the basic transmission data formats employed in the system 10. Each transmission sequence is initiated by an interrogation sequence from the CDS 11. The remote transceivers 12—12 which are identified, subsequently transmit either a 16-bit word of data to the CDS 11 or accept an additional 16-bit command code to be executed at the remote transceiver.

Referring to FIG. 2a there is shown the remote transceiver interrogation format. This includes an initial pair of logic 1 pulses which are transmitted to alert the remote transceiver that a sequence is forthcoming and to synchronize the clocking means at the head end of the system. Thereafter follows a 10-bit field containing the unit identification code and permits 1023 identification codes to be utilized to identify units which have been precoded to match the interrogation code. Only those units precoded to match the interrogation code will continue to accept subsequent incoming data. The next incoming field is a 4-bit word-command code which indicates which one of 16 words will be transmitted to the CDS 11 from the identified remote unit, or which of 16 command codes will be forthcoming from the CDS 11. The final field shown in FIG. 2a indicates whether a word code or command code is intended in the previous field. The interrogation sequence shown in FIG. 2a contains 17-bits of information which are transmitted at a rate of 40 microseconds per bit resulting in a total required transmission time of 680 microseconds.

FIG. 2b shows a first of 16 possible word codes in the transmission sequence when it is desired to transmit 16-bits of information from the remote transceiver 12 to the CDS 11. The word-command code field in the interrogation sequence in FIG. 2a indicates which word transmission is desired. After the interrogation system, 16 subsequent data pulses are transmitted by the CDS 11 to enable each bit to be transmittted back to the CDS 11. Since the CDS 11 controls this sequence, propogation time to the furthest point in the cable system and return from that point must be taken into account. The total time required for a word transfer is the interrogation sequence time, plus 16 data pulses at 320 microseconds each totalling 5.8 milliseconds. It should be noted that 500 microseconds of dead time is required between interrogation sequence to permit the remote transceiver to become completely reset.

The word code shown in FIG. 2b is generated from a decoder at the remote transceiver in response to the interrogation sequence from the CDS 11. The particular word shown in FIG. 2b which is the "word one" word code includes three initial alarm bits for determining the condition of, for example, fire alarms, burglar alarms and the like, an on/off bit to determine whether or not the remote transceiver being interrogated is on or off, four opinion or response bits to obtain a viewer response or opinion, five channel selector bits to determine to which program channel the remote transceiver is tuned, a pay television bit, a waiting bit, and a monitoring bit.

The format may include command codes when it is desired to perform an electrical or mechanical function at the remote transceiver location. The command codes, however, are not of interest in the present application. A more thorough discussion of similar interrogation sequences and word codes may be found in U.S. Pat. 3,794,922 and 3,803,491.

Referring now to FIG. 3, there is shown a more detailed block diagram of an individual remote transceiver 12. Each remote transceiver 12 is connected to the CDS 11 via the cable system 13 for the purpose of transmitting information from each remote location and receiving and executing commands from the CDS 11 at the remote locations. Each remote transceiver 12 includes five fundamental sub-assemblies: an RF receiver 46, a digital section 47, an RF transmitter 48, a video converter 51 and a remote control logic unit 52.

The RF receiver 46 interfaces the remote transceiver 12 to the cable network 13 and detects the digital data being transmitted downstream by the CDS 11. The detected data is translated to standard TTL logic levels compatible for input to the digital section 47. In addition, the RF receiver 46 provides electrical isolation to the cable system from any spurious radiation generated by the video converter 51 and recombines the output of the RF transmitter 48 with the receiver input into the cable system.

The digital section 47 receives the detected digital data from the RF receiver 46, stores the information in a shift register and subsequently analyzes the data for possible action. The digital section 47 has the capability of coordinating the transmission of any of 16 16-bit words of information to the CDS 11 and/or executing any of 16 16-bit commands as instructed by the CDS 11. The digital section 47 has the inherent capability of transmitting one specific word of information (word one) to the CDS 11. This word has been preassigned and is hard wired within the digital section 47 of the remote transceiver 12. All additional words to be transmitted must be externally decoded and generated from the digital section 47.

The digital section 47 also resets numerous functions through the use of command codes. One specific function enables or disables the transmitter 48 oscillator from basic operation. This function protects the remaining remote transceiver within a given group if one remote transceiver should fail and transmit a CW signal.

The RF transmitter 48 accepts the digital information from the digital section 47 and translates the received data into a modulated form which is compatible for detection by the receiver/register assembly in the RF section 26 (FIG. 1) at the head end of the system. An oscillator and a modulator within the RF transmitter are each independently controlled by digital section 47.

The video converter 51 is a television channel converter which translates 26 contiguous channels of commercial video bandwidth information to a single television channel output. This output usually corresponds to commercial channel 3 or channel 12. The converter 51 may be a Gamut 26, manufactured by Oak Manufacturing, Inc.

The output of the video converter 51 is connected through a suitable transmission line and matching transformer to the VHF input of a commercial television receiver 53. The television receiver 53 has its power cord connected to a receptacle in the remote transceiver 12 which is coupled to a power control circuit 57, which in turn, is connected to a suitable local source of alternating voltage 58, for example, a 120 V.-60 hz. outlet. A power supply circuit 61, also connected to the source 58, provides suitable d.c. operating voltage levels for the RF receiver 46, the digital section 47, the RF transmitter 48, the video converter 51 and the logic unit 52.

The logic encoder unit 52 provides a digital output which may be read directly by a data readout circuit (FIG. 4) in digital section 47 and applied to the transmitter 48 in response to a word one interrogation signal transmitted downstream from the CDS 11 to the remote transceiver 12 to indicate which channel has been selected and is thus being viewed on the television receiver 53. The digital channel information output of the digital section 47 is converted to an analog voltage by an digital-to-analog converter (FIG. 4) therein and is applied to a resistor network in the video converter 51 which provides a predetermined voltage to a varactor tuner which selects one channel out of the information transmitted from the RF receiver 46 to the video converter 51.

A plurality of alarm circuits, generally indicated at 65, are coupled to the digital section 47. These may include, for example, fire alarms, burglar alarms, water and/or gas meters and the like.

FIG. 4 shows a schematic diagram of the logic unit 52 and relevant portions of the digital section 47. The logic unit 52 is preferably a hand-held unit containing a channel selector and encoder 66 and a multiple contact switching means 67 and is coupled to the digital section 47 through a multiple conductor cable 68. The logic unit 52 is a hand-held remote control tuner and response device which is coupled to a control box which may be placed on or in the commercial television receiver 53. Such a control box 71 is shown in phantom lines in FIG. 3 and contains all of the essential elements of the remote transceiver 12 with the exception of the local power source 58 and the commercial television receiver 53.

The channel selector and encoder 66 may be of the rotary shaft-encoder type shown and described in U.S. Pat. No. 3,794,922, which includes a dial 72 and five camming elements 73–77 secured to a rotatable shaft 78. Each of the camming elements 73–77 includes a plurality of notches spaced circumferentially therearound, the length thereof varying from one camming element to the next to operate one of a plurality of switches 81–85 to define a different combination of operated switches for each rotary position of the dial 72. Each switch 81–85 selectively connects one of a plurality of data lines 87–91 to ground.

The switch 67 includes five pairs of terminals 94–98 and a pair of moveable contacts 99a and 99b. Each pair of terminals has been given a postscript a or b, representing the left or right-hand terminal of the pair. For example, the terminal pair 98 includes a left-hand terminal 98a and a right-hand terminal 98b. The moveable contacts 99a and 99b may be positioned to connect the left-hand terminal of one terminal pair to the left-hand terminal of an adjacent terminal pair and the right-hand terminal of one terminal pair to the right-hand terminal of an adjacent terminal pair, respectively. While shown as utilizing a single set of moveable contacts the switch 67 may be of the push-button key type utilizing a pair of moveable contacts for each of its four possible modes or positions.

In the "OFF" position of the switch 67 the logic unit 52 renders the remote transceiver 12 inactive. In the "CHANNEL SELECT" position, the switch 67 permits the converter 51 (FIG. 3) to be tuned and provides program rating information to the CDS 11, i.e., which channel has been tuned. In the "RESPONSE" position the switch 67 permits the selector 66 to be utilized by the viewer-operator to select a variety of responses or opinions to question put to the viewing audience during a particular program. The "ENTER" position renders the response selected available for transmission back to the CDS 11. A key-operated pay-authorization switch 100 permits the viewer to receive a pay television program.

The data lines 87–91 are connected to the input of a five-bit storage register 101, forming part of the digital section 47 of the remote transceiver 12. The data lines 87–91 form part of the cable 68 together with an operating voltage line 102, a ground line 103, on/off and pay t.v. data lines 106 and 107, respectively, channel select and response enabling lines 108 and 109, respectively, and response reset line 110.

Ground line 103, which is connected to chassis ground in the digital section 47, is connected to terminals 95b and 97b of the switch 67 in the logic unit 52 and selectively, through cam-operated switches 81–85, to the data lines 87–91.

On/off line 106 is connected to terminal 94b of switch 67 directly and to terminals 95a and 97a thereof through first and second diodes 111 and 112, respectively, at a node 113. Node 113, in turn, is connected to ground line 103 through a light-emitting diode (LED) 117 and a series resistor 118. Line 106 is also connected to the input of an inverter 121 through the normally open pay-authorization switch 100 and a series resistor 123 and to the output of the inverter 121 through the series combination of a resistor 126 and an LED 127. A resistor 128, which forms part of a voltage divider with the resistor 123, is connected between the input of the inverter 121 and ground line 103. A capacitor 131 may be connected across the inverter 121 to improve the response time thereof.

Operating voltage line 102 is connected to the power supply circuit 61 (FIG. 3) through the digital section 47 and is connected to terminals 96a and 98a of the switch 67 to supply operating voltage to the unit 52.

Enabling line 108 is connected to terminal 95a of switch 67, which is connected to ground line 103 through an LED 132 and a series resistor 133.

Enabling line 108 is also coupled to a first input of an AND gate 138, having its output connected to the storage register 101 in the digital section 47. A second input of the AND gate 138 is coupled to the output of a clock 141. A positive or logic high voltage level on the line 108 enables the AND gate 138 to pass the clock 141 pulses to the storage register 101 to store the channel selector coded information therein from the data lines 87–91.

Enabling line 109 is coupled to a first input of each of a plurality of AND gates 142–145, each having a second input coupled to one of the data lines 88–91 at the input of the register 101. A logic high voltage level on enabling line 109 enables AND gates 142–145.

Enabling line 109 is also coupled to the output of a NAND gate latch circuit 146 through a NAND gate 147 having a first input connected to the inverted output of the latch 146 and a second input connected to the terminal 97a of the switch 67 across a resistor 148 and an LED 149. A set input 150 of the latch 146 is connected to the terminal 98b of the switch 67 while a clear or reset input 151 of the latch 146 is connected to response reset line 110. A resistor 152 and an LED 153 are connected in series between line 106 and the output of the latch 146.

Storage register 101 has five output lines 154–158 which are coupled to the input of a digital-to-analog converter 159 having an output 160 coupled to the converter 51 (FIG. 3) to tune a varactor tuner therein to select one channel out of 26 available program channels for viewing on the television receiver 53.

Output lines 154–158 of the channel-select storage register 101, the outputs of the viewer response AND gates 142–145, on/off line 106 and pay t.v. line 197 are connected to the input of a data readout circuit 161 in the digital section 47. The data readout circuit 161 may be of a type similar to that shown and described in U.S. Pat. No. 3,803,491 which stores the binary information from the input lines thereof in parallel and, in response to a word one interrogation signal from the CDS 11 and a subsequent application of a word one signal from a word count decoder in the digital section 47, serially delivers the information to the transmitter 48 (FIG. 3) on a line 162 for transmission of a reply signal upstream to the CDS 11 through receiver 46 and the cable network 13.

The logic unit 52 is usually placed at a convenient location with respect to the control box 71 and the television receiver 53 at the remote transceiver 12. The remote transceiver 12, when utilized in a cable television system, is customarily referred to as a "home terminal," since the great majority of remote transceivers 12—12 are placed in homes to permit viewers to select various programs from the CDS 11 for viewing, permit the CDS 11 to interrogate the home terminal for program rating information and viewer response or opinion information and to monitor the various alarms and metering information from all of the home terminals in the system.

In operation the logic unit 52 may be utilized by a viewer to select a particular television program by operating the switch 67, moving the contacts 99a and 99b from the OFF position shown in FIG. 4 to the "CHANNEL SELECT" position wherein terminals 95a and 96a are connected through contact 99a and terminals 95b and 96b are connected through contact 99b. This establishes a circuit from operating voltage line 102 through diode 111 resistor 118 and LED 117 to the ground line 103, lighting the LED 117 to indicate to the viewer that the unit 52 is on. LED 117 will be illuminated in all positions of the contacts 99a and 99b other than the OFF position shown in FIG. 4. At the same time a circuit is established from line 102, through resistor 133 and LED 132 to ground line 103, lighting LED 132 to indicate that the logic unit 52 is in condition for selecting a television program channel with the channel selector and encoder 66 by rotating the selector dial 72 and the shaft 78 to operate a selected combination of the switches 81–85 through the camming elements 73–77 to ground selected ones of the data lines 87–91 at the input of the storage resistor 101.

The voltage across resistor 118 and LED 117 appears on line 106 and thus is available at the input of the data readout circuit 161 for subsequent transmission to the CDS 11 in response to a word code interrogation signal therefrom to indicate that the remote transceiver 12 is on.

The voltage across the resistor 133 and LED 132 appears on line 108, enabling the AND gate 138 to pass clock pulses from the clock 141 to the storage register 101 to store therein the binary channel select information on data lines 87–91. The stored channel select information is available to the data readout circuit 161 from the output lines 154–158 of the storage register 101 for subsequent transmission to the CDS 11 in response to a word code interrogation signal therefrom seeking program rating information.

If, during the viewing of a selected program, audience opinion or response is requested and the viewer elects to participate, he first operates the switch 67 placing it in the "RESPONSE" position wherein contact 99a connects terminals 96a and 97a and contact 99b connects terminals 96b and 97b.

In the RESPONSE position of the switch 67 operating voltage from line 102 is no longer applied to the LED 132 and line 108 goes low disabling AND gate 138 to prevent further clock signals to be applied to the storage register 101. Thus the condition of data lines 87–91 has no effect on the output lines 154–158 of the storage register 101 which retain the channel select information and keeps the television receiver 53 tuned to the selected channel through the digital-to-analog converter 159 and the converter 51.

In the RESPONSE condition of the switch 67 LED 117 is operated by the voltage supplied from line 102 through the diode 112 and resistor 118. At this time LED 149 is operated through the resistor 148 to indicate to the viewer that he can respond to the question asked or give his opinion by selecting a number on the dial 72 of the channel selector and encoder 66. The voltage across resistor 148 and LED 149 drives the normally high output of NAND gate 147 low disabling the viewer response and gates 142–145.

The viewer may now select a response by rotating the selector dial 72 and the shaft 78 to cause the camming elements 73–77 to operate switches 81–85, to change the binary information on data lines 87–91, the last four of which will determine the binary outputs of the AND gates 142–145. This provides a wide range of viewer response information to be presented to the date readout circuit 161. Though only four of the data lines 88–91 are shown as being utilized for viewer response it will be appreciated that all five data lines could be utilized by adding an additional AND gate to the group of AND gates 142–145 and connecting one input thereof to line 87 and one input to line 109. Fewer than four data lines can be utilzied for viewer response by disconnecting or removing one or more of the AND gates 142–145.

Since the AND gate 138 is disabled by the low on line 108 when the switch 67 is in the RESPONSE position, tuning of the television receiver 53 is controlled solely by the stored output of the register 101 through the converters 159 and 51 and does not change while the viewer makes his response selection.

To enter his response into the data readout circuit 161, the viewer moves the switch 67 into the "RESPONSE ENTER" position wherein terminals 97a and 98a and 97b and 98b of the switch 67 are connected through movable contacts 99a and 99b, respectively.

In the RESPONSE ENTER position of switch 67, LED 149 remains illuminated and the ground line 103 is connected to the set input 150 of the latch 146 through terminals 97b and 98b and the movable contact 99b applying a logic low to the input 150 of the latch 146 and driving the normally high output thereof low. This drives the output of the NAND gate 147 high enabling AND gates 142–145 and operating the LED 153.

The binary response information on data lines 88–91 is then entered in parallel in the data readout circuit 161 through the enabled AND gates 142–145 and is available for subsequent serial transmission to the CDS 11 in response to a word code interrogation signal therefrom.

The latch 146 may be reset by a command signal on line 110 in response to a command interrogation code signal from the CDS 11.

When the switch 67 is in the CHANNEL SELECT condition, the viewer may select a pay television program for viewing by additionally closing the key-operated pay authorization switch 100 to drive the normally high output of the inverter 121 low. A low on the output of the inverter 121 operates the LED 127 to indicate to the viewer that he is tuned to a pay television program and makes this information available to the data readout circuit 162 through the line 107 for subsequent transmission to the CDS 11 in response to a word code interrogation signal therefrom.

As mentioned previously, the parallel information stored in the data readout circuit 161 is applied to the transmitter 48 upon application of the word one signal to the data readout circuit 161 from a word count decoder (not shown) in the digital section 47. The word one signal, which may be applied to input 170 (FIG. 4) of the data readout circuit 161 may have the format shown in FIG. 2b as taught in U.S. Pat. Nos. 3,794,922 and 3,803,491 wherein various word formats are generated to store various information, including information from the alarms 66 (FIG. 3) in the data readout circuit 161. Other formats are possible, for example, each bit of information may be stored sequentially in response to individual sequentially generated word count signals within the digital section 47 in response to an interrogation signal from the CDS 11.

Although the invention has been shown and described in connection with a particular two-way cable television system, its use in other systems will readily be obvious to those having ordinary skill in the art without departing from the spirit and scope of the present invention as defined in the annexed claims.

What is claimed is:

1. A remote unit for a two-way cable communications system including a master station for transmitting television program and interrogation signals and for receiving reply signals, which comprises;
   receiver means for receiving television program and interrogation signals transmitted by said master station;
   transmitter means for transmitting reply signals back to the master station;
   television receiver means coupled to said receiver means for reproducing television programs corresponding to received television signals;
   channel selector means for selecting the television channel to be viewed and for providing viewer response information;
   encoder means coupled to said channel selector means for encoding the selected channel and viewer response information into digital signal representations;

switch means having first, second and third operative conditions;

storage means coupled to said encoder means for storing said channel selector information when said switch means is in said first and second operative conditions;

gate means coupled to said encoder means and enabled when said switch means is in first and second conditions;

tuning means coupled to said television receiver for selecting a program channel;

converter means for applying the output of said storage means to said tuning means for controlling said tuning means;

means for operating said gate means when said switch means is in said third condition; and decoder means coupled to said gate means and said storage means and responsive to a selected interrogation signal for applying the output of said gate means and said storage means to said transmitter means.

2. A remote unit according to claim 1 including means for providing a visual indication of each operative condition of said switch means.

3. A remote unit according to claim 1 wherein said means for operating said gate means includes resettable latching means coupling said switch means to said gate means and means responsive to a signal from said master station for resetting said latch means.

4. A remote unit according to claim 2 wherein said latching means and said encoder means are coupled to said gate means and said storage means, respectively, through a common multiconductor cable.

5. A remote unit according to claim 4 wherein said storage means includes a plurality of binary inputs coupled to said encoder means, clocking means for enabling said storage means and means coupling said clocking means to said storage means when said switch means is in said first condition.

6. An apparatus for controlling a remote transceiver in a two-way cable television system, wherein the remote transceiver includes a transmitter, tuning means for connecting to a television receiver, and decoder means responsive to logic encoded information for applying said information to said transmitter, which comprises:

channel selector means having a plurality of selectively operable contact means coupled to a plurality of output lines for providing channel select information;

a storage register having a plurality of inputs coupled to said output lines;

clock means for enabling said storage register;

first gate means for selectively coupling said clock means to said storage register;

converter means coupling said register to the tuning means to control the tuning means in accordance with the stored information;

multiple position control switch means having first, second and third operative conditions;

means coupling said first gate means to said control switch means for enabling said first gate means when said control switch means is in said first condition to store said channel select information;

a plurality of second gate means, coupled to corresponding ones of said output lines and being selectively enabled by the information thereon;

latching means coupling said control switch means to all of said second gate means for operating the enabled ones of said second gate means when said control switch means is in said third condition; and means coupling the outputs of said gate means and said storage register to the decoder means.

7. An apparatus according to claim 6 and including means coupled to said control switch means for providing a visual indication of each condition of said control switch means.

8. An apparatus according to claim 6 wherein said latching means is coupled to said second gate means and said output lines are coupled to said storage register through a multi-conductor cable.

9. An apparatus according to claim 6 and including means for precluding said channel selector means from affecting the information stored in said storage register when said control switch means is in said second and third conditions.

10. An apparatus according to claim 9 wherein said control switch means includes means for sequentially positioning said switch means into its first, second and third conditions, said first condition defining a channel select mode to select a television program for viewing, said second condition defining a viewer response select mode and said third condition defining a response entry mode of controlling said remote transceiver.

11. An apparatus according to claim 10 wherein said channel selector means provides both channel select and response select information.

12. An apparatus according to claim 11 wherein said channel selector is a shaft encoder for selectively operating said contact means.

* * * * *